Nov. 7, 1967     J. H. BLACKETT     3,351,821
COUNTERS FOR COUNTING CELLS IN SUSPENSION AND CIRCUIT THEREFOR
Filed Aug. 3, 1964

United States Patent Office 3,351,821
Patented Nov. 7, 1967

3,351,821
COUNTERS FOR COUNTING CELLS IN SUSPENSION AND CIRCUIT THEREFOR
John Harold Blackett, Croydon, Surrey, England, assignor to Vickers Instruments Limited, York, England, a British company
Filed Aug. 3, 1964, Ser. No. 386,825
4 Claims. (Cl. 317—148.5)

ABSTRACT OF THE DISCLOSURE

A sample volume measuring device for use in a counter for counting cells in suspension. The device includes a container and the cell suspension, which is electrically conductive, is either supplied to, or withdrawn from the container. The latter has three probes at upper, intermediate and lower levels respectively in the container and the probes are incorporated in an electrical control circuit. The circuit includes a relay for actuating cell counting means forming part of the counter and two relay controlling transistors. The counting means are operated while the liquid level is changing from the level of the upper probe to that of the intermediate probe or vice versa.

---

This invention relates to counters for counting cells in suspension and is concerned with an improved sample volume measuring device for use in such counters.

According to the present invention, there is provided in a counter for counting cells in suspension a sample volume measuring device including a container, first and second probes located respectively at predetermined differing levels in said container and an electrical control circuit incorporating said probes and arranged, upon a cell suspension which has been rendered electrically conductive being supplied to, or withdrawn from, the container to actuate cell counting means forming part of said counter whilst the liquid level in said container is changing from one said probe level to the other.

Figure 1:
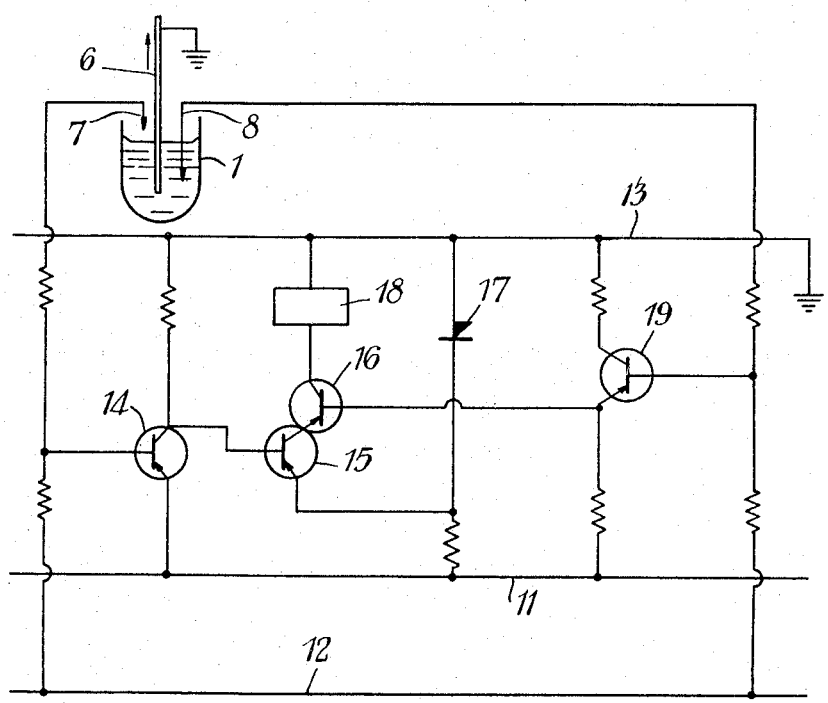
Figures 2, 3:
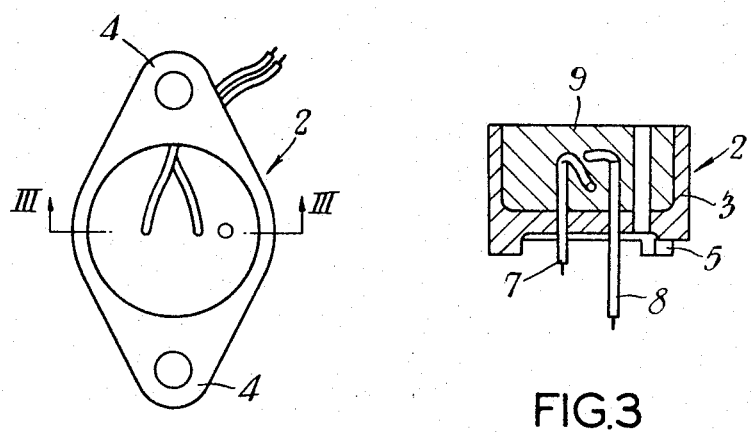

In order that the invention may be more fully understood, one construction of sample volume measuring device, in accordance with the invention and for use in a blood cell counter, will now be described by way of example, with reference to the accompanying drawing, in which:

FIGURE 1 shows schematically the measuring device,
FIGURE 2 shows a container cap forming part of the measuring device, and
FIGURE 3 shows a section taken on the line III—III of FIGURE 2.

Referring now to the three figures of the drawing, the blood volume measuring device comprises a glass container 1 of a capacity greater than the blood sample required which is open at its upper end and which is provided with a cap 2 for fitting over this upper end. The cap, which is made of synthetic resin material, comprises a generally cylindrical body 3 carrying at diametrically opposed points two ears 4 which are each drilled for mounting purposes. One circular face of the cap is provided with three equally spaced projections 5 which bear against the rim of the container 1 so as to leave air gaps between the rim of the container and the cap 2. The opposite face of the cap is recessed as shown and the wall of the cap body separating the recess from the projections 5 is drilled in three places to receive respectively a suction tube 6, a first probe 7 and a second probe 8. The tube 6 which is of stainless steel is positioned in the body 3 to project, when the cap 2 is fitted to the container 1, into the container almost to the bottom thereof whereas the probes 7 and 8, which each consist of a needle in the form of a stainless steel tube having at its lower end a platinum rhodium pointed tip, respectively project to predetermined upper and lower levels in the container 1 both of which levels are above the level of the suction tube lower end. The upper end of the tube 6, which constitutes a third probe, projects above the mouth of the recess formed in the upper end of the cap 2 whereas the two probes 7 and 8 terminate in this recess. The tube 6 terminates at its upper end in a liquid connector, not shown, and the upper ends of the probes 7 and 8 are connected to leads forming part of a control circuit which will be described later.

The positioning of the probes 7 and 8 in the cap and hence the determination of the upper and lower liquid levels is effected during manufacture of the cap 2 on a calibration rig. The probe assembly is set up on a sample container and liquid is withdrawn through the suction tube to a calibrated pipette. The height of the probe 7 is adjusted until this probe breaks contact as the liquid in the pipette passes a lower calibration mark. The amount of projection of the probe 8 is then adjusted until it breaks contact with the liquid when the same reaches an upper calibration mark on the pipette. When the adjustment is completed, the upper recess in the cap is filled with cast resin 9 to secure the probes in position. For a given container, the positioning of the probes determines the volume of the part of the container between the two levels and a number of interchangeable glass sample containers may be used providing their internal diameters is accurately controlled.

Turning now to the control circuit this comprises two rails 11 and 12 which, in the actual device under consideration, are maintained at positive potentials of 12 volts and 20 volts respectively and a third rail 13 which is connected to the tube 6 and which is earthed. A transistor 14 is connected across the rails 11 and 13, as shown, with the base electrode of this transistor connected to the common terminal of two resistors connected between the rails 12 and probe 7.

Two further transistors 15 and 16 are connected in series between the rails 11 and 13 with the base electrode of the transistors 15 connected to the collector of the transistor 14. A resistance is interposed between the transistor 15 and the rail 11 and a Zener diode 17 is connected between this resistor and the rail 13. The purpose of the diode 17 is to maintain the potential of the emitter of the transistor 15 at a predetermined value, which in the circuit under consideration is —5 volts with respect to the rail 11. A relay 18 which controls a blood counting means not shown is connected in series with the transistors 15 and 16, which constitute first and second switching means for controlling current through the relay, being in fact interposed between the transistor 16 and the rail 13. Lastly a fourth transistor 19 is connected across the rails 11 and 13 with resistances respectively interposed between the emitter of this transistor and the rail 11, and between the collector and the rail 13. The emitter of the transistor 19 is also connected to the base electrode of the transistor 16, and the base thereof is connected to the common terminal of two resistances connected between the rail 12 and the probe 8.

In operation of the device, assume that the container 1 is initially charged with liquid so as to immerse both the probes 7 and 8 and that the liquid is being withdrawn from the container and fed to the counter. Assume also that the supply to the transistors is switched on. By virtue of both probes 7 and 8 being immersed in the liquid which comprises blood diluted in an electrically conducting liquid, current paths are established between the probes 7 and 8 and the tube 6. The transistors 14 and 19 are conducting, which in turn causes the transistor 15 to be cut off although the transistor 16 is in a conductive state. Since the relay 18 is in series with the transistors 15 and 16, it will not be energized. However as the liquid falls below the upper level, contact with the probe 7 is broken causing the transistor 14 to be switched off, which in turn causes the transistor 15 to conduct allowing current to flow through the transistors 15 and 16 and hence through the relay 18. The counter is now switched on and the count period begins. It will thus be seen that the transistor 14 forms biassing means for the transistor 15 which means are controlled by the liquid level in the container 2.

When the liquid breaks contact with the probe 8, the transistor 19 which forms biassing means, controlled by the liquid level in the container 2, for the transistor 16, is switched off causing the transistor 16 to be switched off also, thus releasing the relay 18 and the count period terminates. The volume of blood withdrawn during the count period is, of course, variable by adjusting the distance between the probes.

As the probes are made with points having an included angle of 35°, a clean break with the liquid surface is ensured and the probes do not draw out a liquid filament. The form of probe construction as described above provides a rigid probe with a corrosion resistant tip.

The transistor relay circuit as described passes a small current through the liquid in the container, that is, less than 50µa. This prevents electrolysis forming gas bubbles at the probe tips. Moreover the circuit is not sensitive to any changes in resistance that occur as the liquid level runs down the probe tips to the extent that such changes would initiate a switching action.

Although the common diluting fluids used for cell-suspensions have resistivities not exceeding 80 ohms/centimeters, the above described device is suitable for solutions having a resistivity of up to 800 ohm/centimeters.

I claim:
1. In a counter for counting cells in suspension which incorporates cell counting means, a sample volume measuring device including a container, means for supplying to or withdrawing from the container an electrically conductive cell suspension, first and second probes located in said container at predetermined upper and lower levels respectively, a third probe located in said container below said second probe and an electrical control circuit incorporating said probes, said circuit further incorporating a relay arranged upon energization to actuate the counting means and upon de-energization to interrupt operation of said counting means, first switching means to interrupt current through the relay whilst the liquid connects the first and third probes, and second switching means to interrupt current through the relay whilst the liquid level is below that of said second probe, whereby the relay is energized to actuate the cell counting means whilst the liquid level is changing from the level of one of the first and second probes to the other.

2. A sample volume measuring device as set forth in claim 1, in which the circuit incorporates first and second supply lines and a return line to which return line the third probe is connected, and said first and second switching means respectively comprise first and second switching transistors connected in series with one another and with the energizing coil of the relay between the first supply line and the return line, each switching transistor being provided with a biassing transistor connected between the first supply line and the return line and having biassing resistor means connected between the second supply line and the first probe in the case of the biassing transistor associated with the first switching transistor and between the second supply line and the second probe in the case of the biassing transistor associated with the second switching transistor, to render each biassing transistor conductive when the associated probe is connected to the second supply line, the connections between the switching transistors and their associated biassing transistors being such that the first switching transistor is non-conductive when the biassing transistor associated therewith is conductive and vice versa and the second switching transistor has the same state as the biassing transistor associated therewith.

3. A sample volume measuring device as set forth in claim 1, in which the first and second probes each comprise a length of stainless steel tube having at its lower end a pointed platinum-rhodium tip and said third probe comprises a length of stainless steel tube constructed as a fluid flow tube through which said liquid supply or withdrawal is effected.

4. A sample volume measuring device as set forth in claim 3, in which the probes are mounted in a detachable cap for the container, said probes being secured in a body of cast resin.

References Cited
UNITED STATES PATENTS 3,131,335    4/1964    Berglund et al. _ _ _ _ _ _ 317—123
3,252,420    5/1966    Sorenesen _ _ _ _ _ _ _ _ _ _ 317—123

MILTON O. HIRSHFIELD, *Primary Examiner.*

L. T. HIX, *Assistant Examiner.*